(12) United States Patent
Fung et al.

(10) Patent No.: US 11,050,313 B2
(45) Date of Patent: Jun. 29, 2021

(54) STATOR AND MOTOR COMPRISING SAME

(71) Applicant: Johnson Electric S.A., Murten (CH)

(72) Inventors: Chi Ho Fung, Hong Kong (CN); Kar Wai Lam, Hong Kong (CN); Cai Yong Zhang, Shenzhen (CN); Yi Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 620 days.

(21) Appl. No.: 15/669,574

(22) Filed: Aug. 4, 2017

(65) Prior Publication Data

US 2018/0041085 A1 Feb. 8, 2018

(30) Foreign Application Priority Data

Aug. 5, 2016 (CN) .......................... 201610639610.5

(51) Int. Cl.
| | |
|---|---|
| *H02K 3/28* | (2006.01) |
| *H02K 3/52* | (2006.01) |
| *H02K 1/14* | (2006.01) |
| *H02K 21/02* | (2006.01) |

(52) U.S. Cl.
CPC .............. *H02K 3/28* (2013.01); *H02K 1/146* (2013.01); *H02K 3/522* (2013.01); *H02K 21/02* (2013.01); *H02K 2203/06* (2013.01)

(58) Field of Classification Search
CPC .......... H02K 3/28; H02K 3/522; H02K 1/146; H02K 21/02
See application file for complete search history.

(56) References Cited

U.S. PATENT DOCUMENTS

| | | | |
|---|---|---|---|
| 2001/0002776 A1* | 6/2001 | Suzuki | H02K 3/28 310/71 |
| 2006/0091746 A1* | 5/2006 | Takeuchi | H02K 3/522 310/71 |
| 2011/0068647 A1* | 3/2011 | Sakaue | H02K 3/28 310/71 |
| 2016/0377025 A1* | 12/2016 | Kamen | F02G 1/043 290/1 A |

FOREIGN PATENT DOCUMENTS

CN 204858771 U 12/2015

* cited by examiner

*Primary Examiner* — Terrance L Kenerly
(74) *Attorney, Agent, or Firm* — Muncy, Geissler, Olds & Lowe, P.C.

(57) ABSTRACT

A stator and a motor including the motor are disclosed. The stator includes a number of windings and a number of guiding portions. The windings are formed by winding a single conductive wire under the guide of the guiding portions. The windings are divided into multiple groups, and the windings in each group are short-circuit connected with each other.

20 Claims, 11 Drawing Sheets

STATOR AND MOTOR COMPRISING SAME

CROSS REFERENCE TO RELATED APPLICATIONS

This non-provisional patent application claims priority under 35 U.S.C. § 119(a) from Patent Application No. 201610639610.5 filed in The People's Republic of China on Aug. 5, 2016.

FIELD OF THE INVENTION

The present disclosure relates to motor technology, and in particular to a stator of a motor and a motor including the stator.

BACKGROUND OF THE INVENTION

In an existing winding method for a motor stator, an electrically conductive wire needs to be cut apart multiple times during a winding process, which leads to a significant waste of winding wires. In addition, in the existing winding method, it can be complicated to subsequently assemble various parts of the stator and connect the windings to an external power source after the winding process.

SUMMARY OF THE INVENTION

Accordingly, a stator is provided which includes a plurality of windings and a plurality of guiding portions. The windings are formed by winding a single conductive wire under the guide of the guiding portions. The windings are divided into multiple groups, and the windings in each group are short-circuit connected with each other.

Preferably, the windings in each group are short-circuit connected with each other through conductive wires or conductive sheets and connected to one electrode or one phase of an external power source.

Preferably, the conductive sheets are metal sheets.

Preferably, the stator includes a stator core, a plurality of tooth portions protrudes from the stator core, and the windings are wound around all or part of the tooth portions, respectively.

Preferably, the stator further includes a first insulating frame disposed at one end of the stator core, the first insulating frame is provided with a plurality of conductive portions, and each of the conductive portions is electrically connected with the conducting wire of one corresponding winding at a predetermined location and then connects the winding to the external power source.

Preferably, the conductive portions are divided into multiple groups, the conductive portions in each group are connected with one corresponding group of windings and then connect the group of windings to one electrode or phase of the external power source.

Preferably, the conductive portions in each group are short-circuit connected through conductive wires or conductive sheets so as to short-circuit connecting the corresponding group of windings.

Preferably, the conductive sheets are embedded in the first insulating frame.

Preferably, the windings have the same winding direction.

Preferably, each of the conductive portions is disposed at a predetermined location on a path of the conductive wire of the corresponding winding extending from one tooth portion to an adjacent tooth portion.

Preferably, each of the conductive portions includes a wire clip configured to clamp the conductive wire of the winding and form an electrical connection with the conductive wire of the winding.

Preferably, the stator further includes a second insulating frame disposed at another end of the stator core, opposite from the first insulating frame.

Preferably, the guiding portions are integrally formed with the first insulating frame or the second insulating frame, and each guiding portion is configured to guide the conductive wire to extend from one tooth portion to one adjacent tooth portion.

A motor is further provided which includes the stator described above.

Preferably, the motor is a single phase permanent magnet brushless motor or a three phase permanent magnet brushless motor.

Implementation of embodiments of the present disclosure can reduce cost and simplify the assembly of the stator.

BRIEF DESCRIPTION OF THE DRAWINGS

The present disclosure is described below in greater detail with reference to the drawings and embodiments

DETAILED DESCRIPTION OF THE PREFERRED EMBODIMENTS

Figure 1:
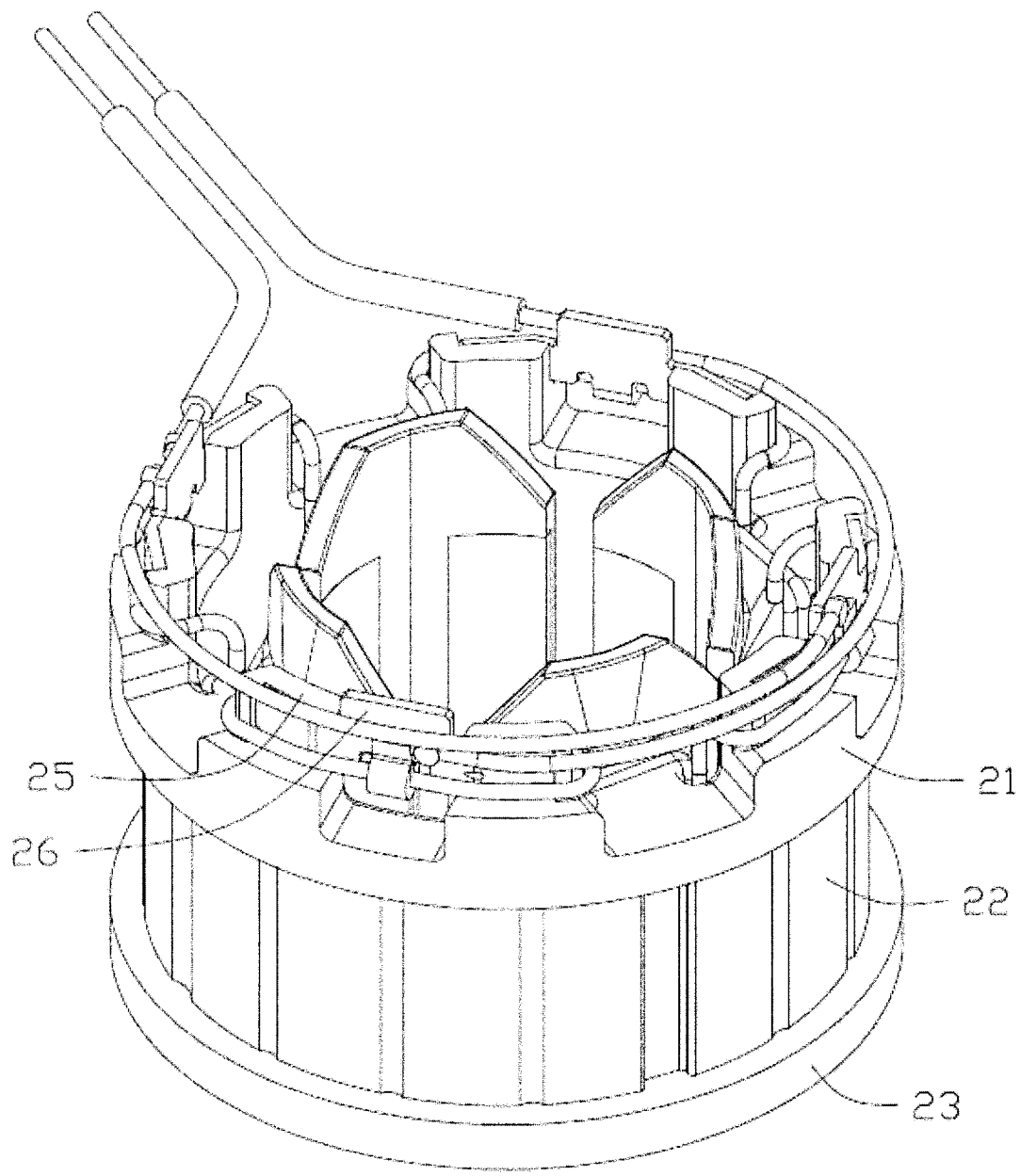
FIG. 1 and FIG. 2 are perspective views of a stator according to one embodiment of the present disclosure, viewed from two aspects.
Figure 2:
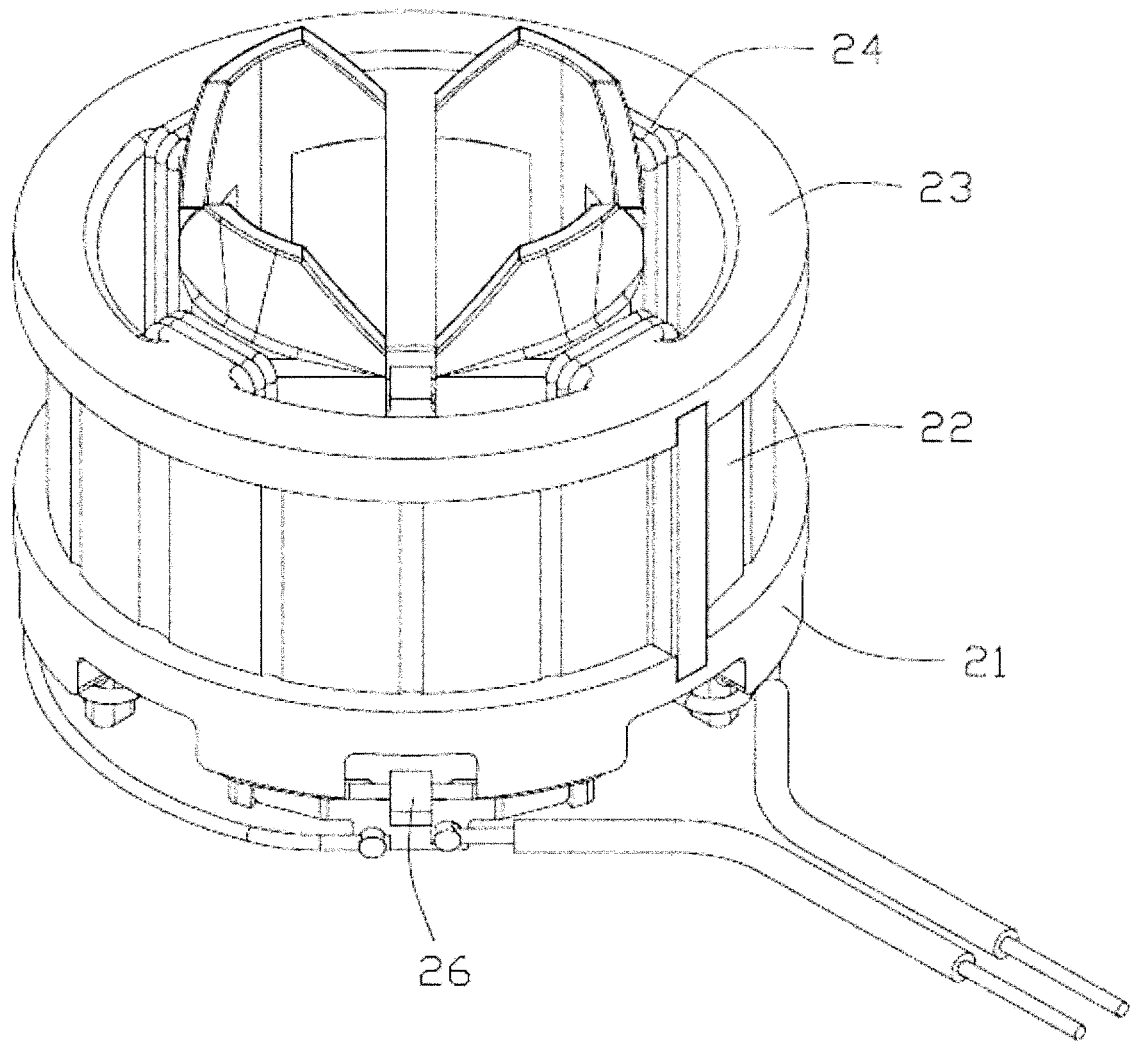
Figure 3:
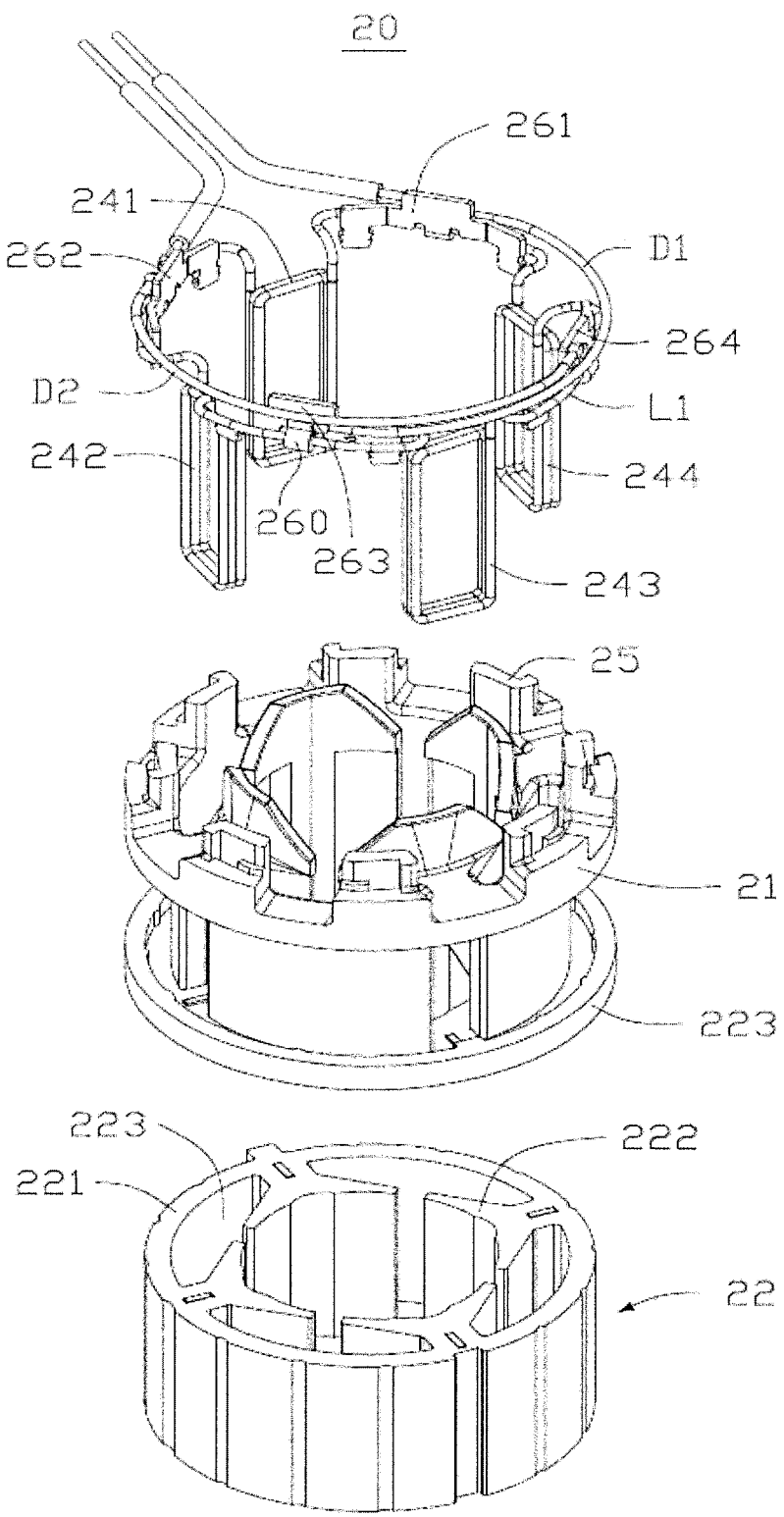
FIG. 3 and FIG. 4 are exploded views of the stator of FIG. 1, viewed from two aspects.
Figure 4:
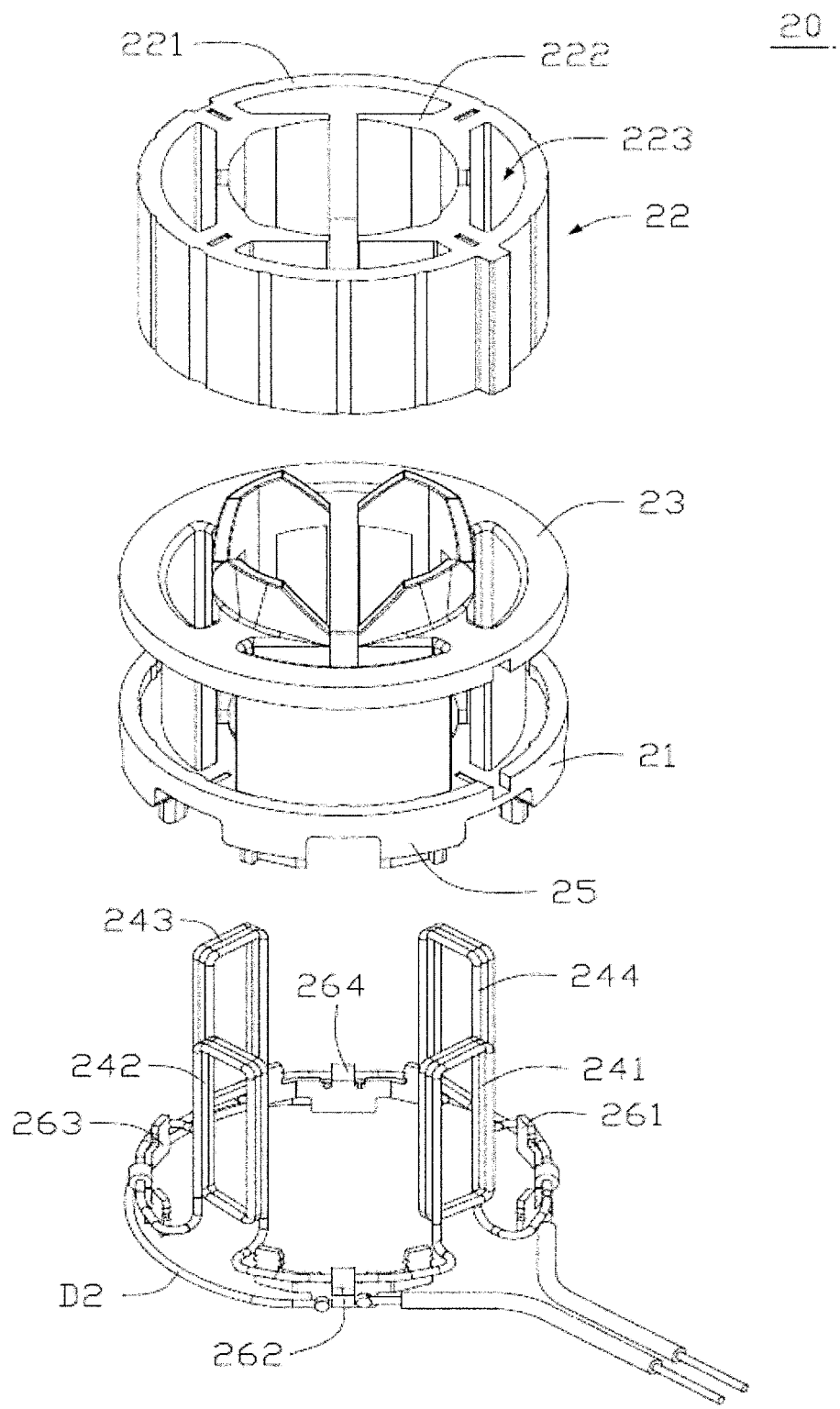

Below, embodiments of the present disclosure will be described in greater detail with reference to the drawings. Elements of similar structures or functions are generally represented by like reference numerals for illustrative purposes throughout the figures. It should be noted that the figures are illustrative rather than limiting. The figures are not drawn to scale, do not illustrate every aspect of the described embodiments, and do not limit the scope of the present disclosure. Unless otherwise specified, all technical and scientific terms used in this disclosure have the ordinary meaning as commonly understood by people skilled in the art.

It is noted that, when a component is described to be "connected" to another component, it can be directly connected to the another component or there may be an intermediate component. When a component is described to be "disposed" on another component, it can be directly disposed on the another component or there may be an intermediate component.

FIG. 1 to FIG. 4 illustrate a stator 20 according to one embodiment of the present disclosure. The stator 20 is a four-slot stator used in a brushless direct current motor. The stator 20 includes a first insulating frame 21, a stator core 22, a second insulating frame 23, and four windings 24.

The stator core 22 includes an annular yoke 221 and four tooth portions 222 protruding from an inner surface of the annular yoke 221 at even intervals. Each two adjacent tooth portions 222 define a slot 223 therebetween. Each winding 24 passes through corresponding slots 223 and is wound around a corresponding tooth portion 222.

The first insulating frame 21 and the second insulating frame 23 are disposed at opposite ends of the stator core 22, respectively. At least one insulating frame 21 or 23 is provided with guiding portions 25. Each guiding portion 25 acts to guide a conductive wire L1 of the windings 24 to extend from one tooth portion 222 to an adjacent tooth portion 222. Therefore, depending on the number of the tooth portions 222, there are at least four guiding portions 25.

In the illustrated embodiment, the guiding portions 25 are disposed on the first insulating frame 21, which are protruding blocks protruding from the first insulating frame 21, corresponding to the slots 223. The protruding blocks are made of an insulating material, and the number of the protruding blocks is four, with each protruding block corresponding to one slot 223. After the conductive wire L1 of the windings 24 has been wound on one tooth portion 222, the conductive wire L1 extends to another adjacent tooth portion 222 under the guide of one corresponding guiding portion 25.

The first insulating frame 21 is further provided with conductive portions 26. The conductive portions 26 are inserted into the guiding portions 25 or disposed in the guiding portions 25 by means of injection molding. According to a routing design of the stator windings, each conductive portion 26 is located on a path of the conductive wire L1 extending from one tooth portion 222 to another adjacent tooth portion 222 and electrically connected with the conductive wire L1. In the illustrated embodiment, a number of the conductive portions 26 is equal to a number of the slots 223, and is four. Each conductive portion 26 includes a wire clip 260 that clamps the conductive wire L1 and is electrically connected with the conductive wire L1. In particular, the conductive wire L1 is an enameled wire, which is stripped at a portion thereof in contact with the wire clip 261, thus forming an electrical connection with the wire clip 261.

Figure 5:
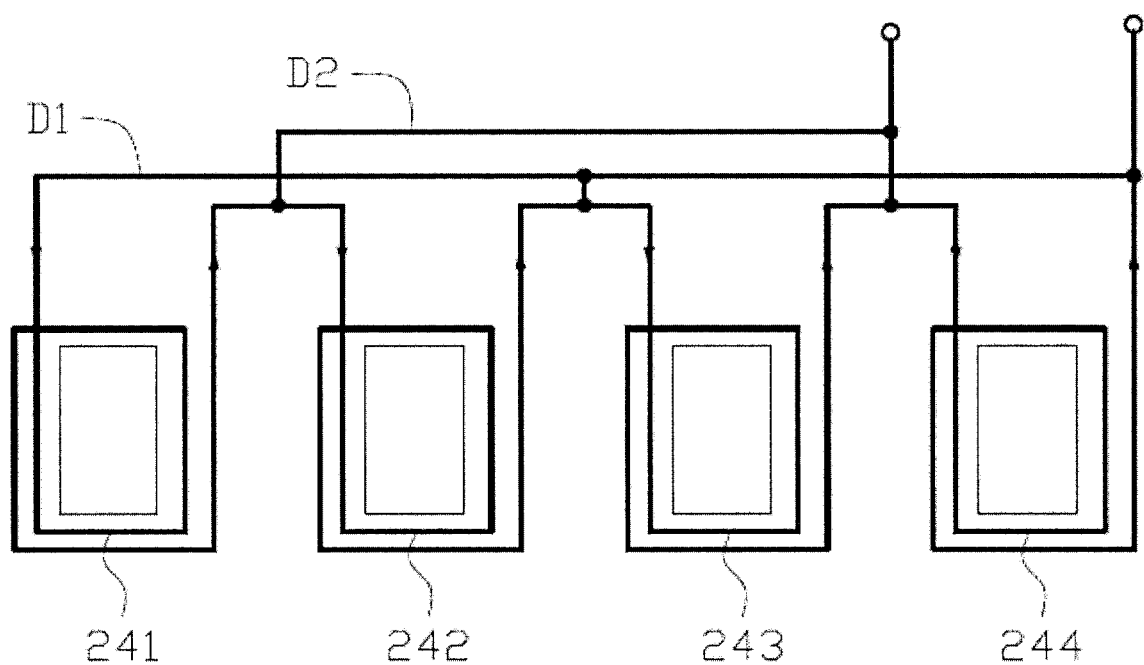
FIG. 5 illustrates routing of windings of the stator of FIG. 1.
Figure 6:
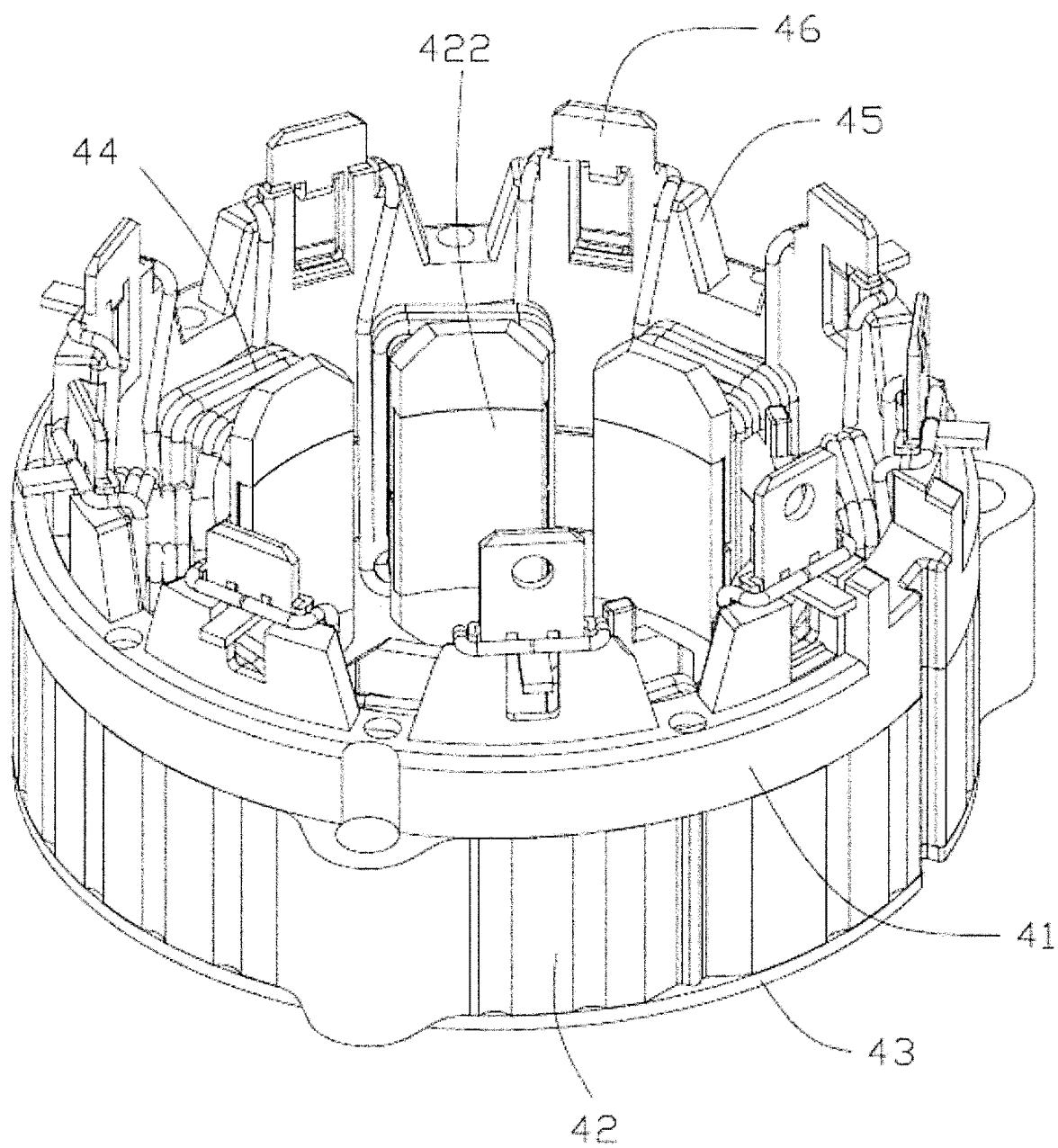
FIG. 6 and FIG. 7 are perspective views of a stator according to another embodiment of the present disclosure, viewed from two aspects.
Figure 7:
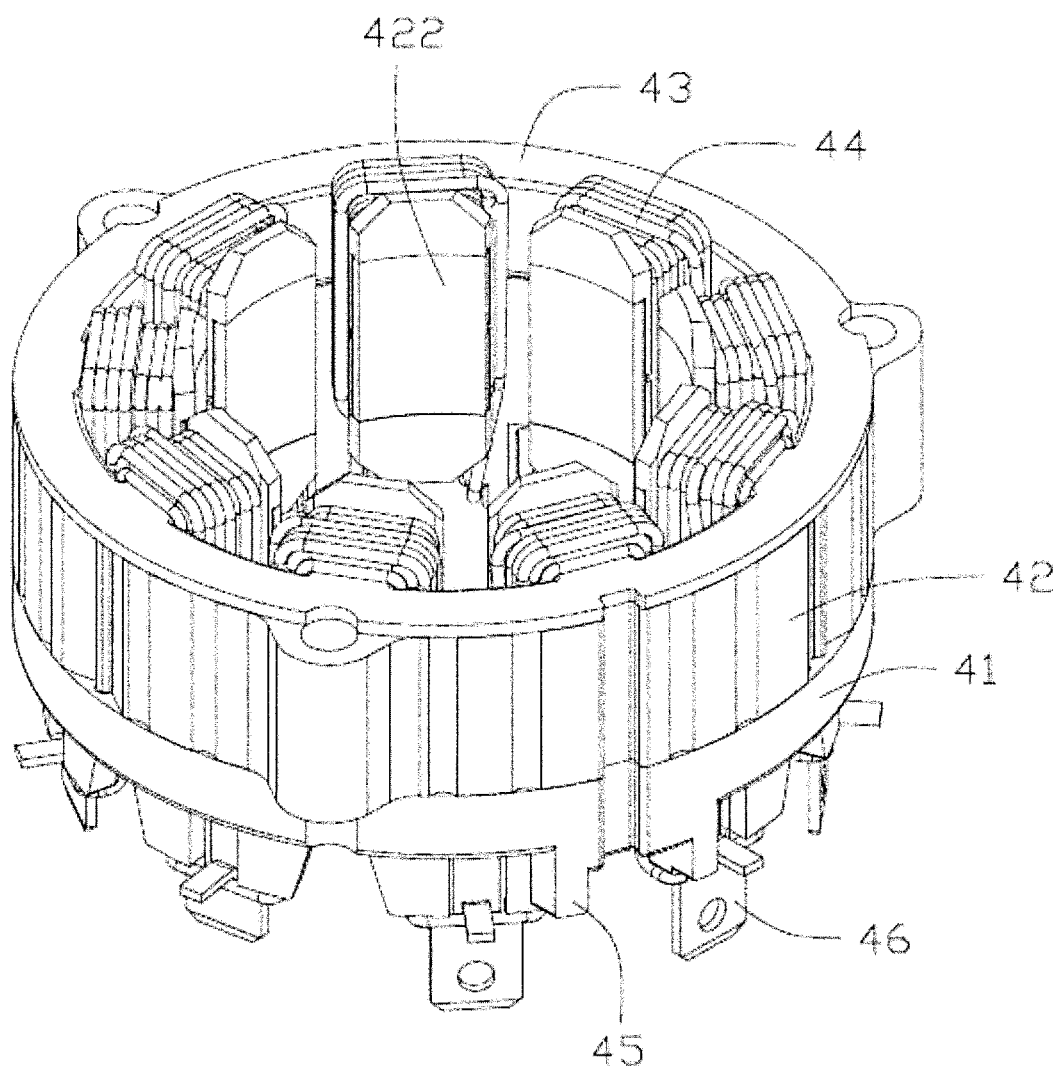
Figure 8:
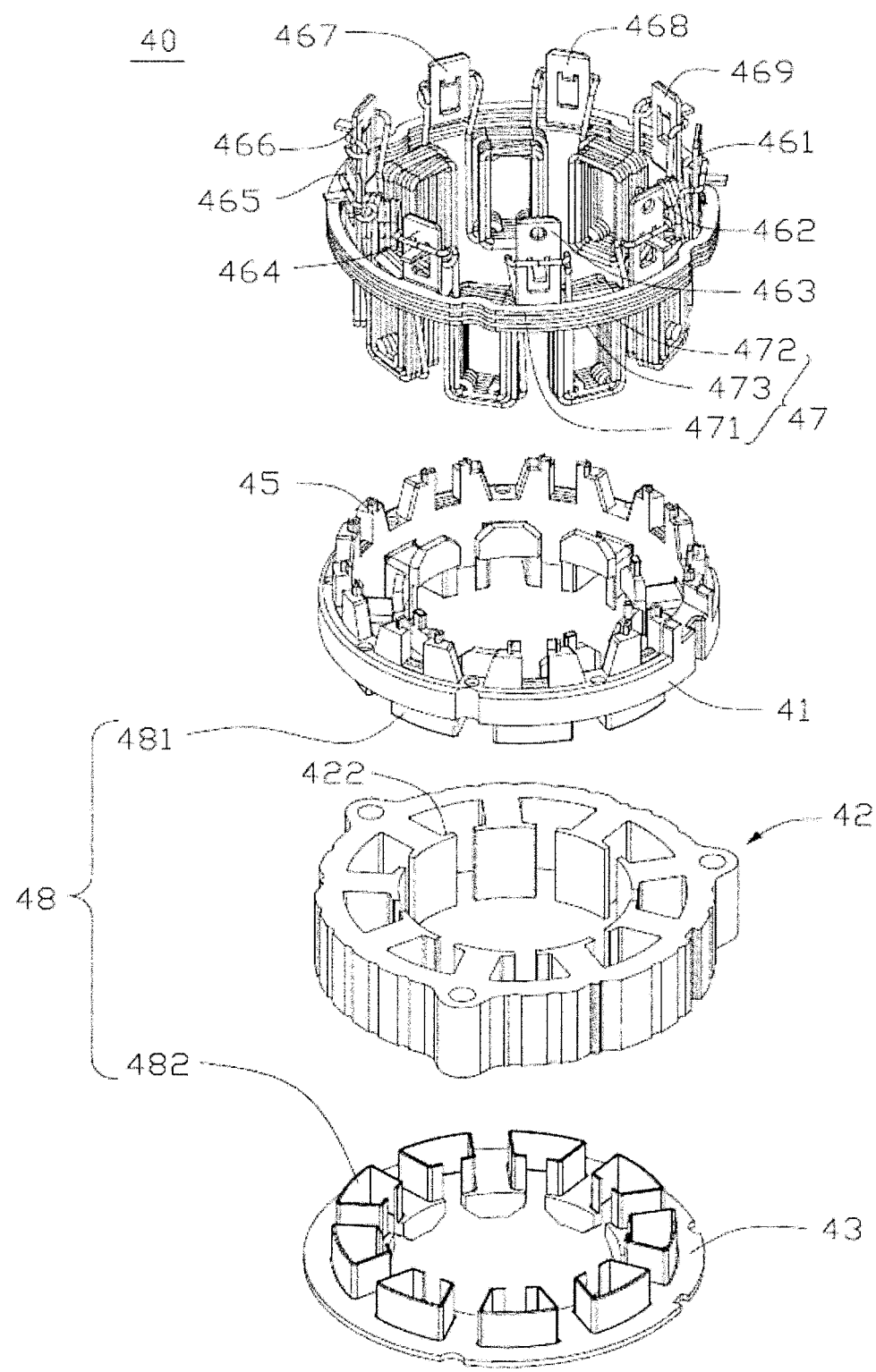
FIG. 8 and FIG. 9 are exploded views of the stator of FIG. 6, viewed from two aspects.
Figure 9:
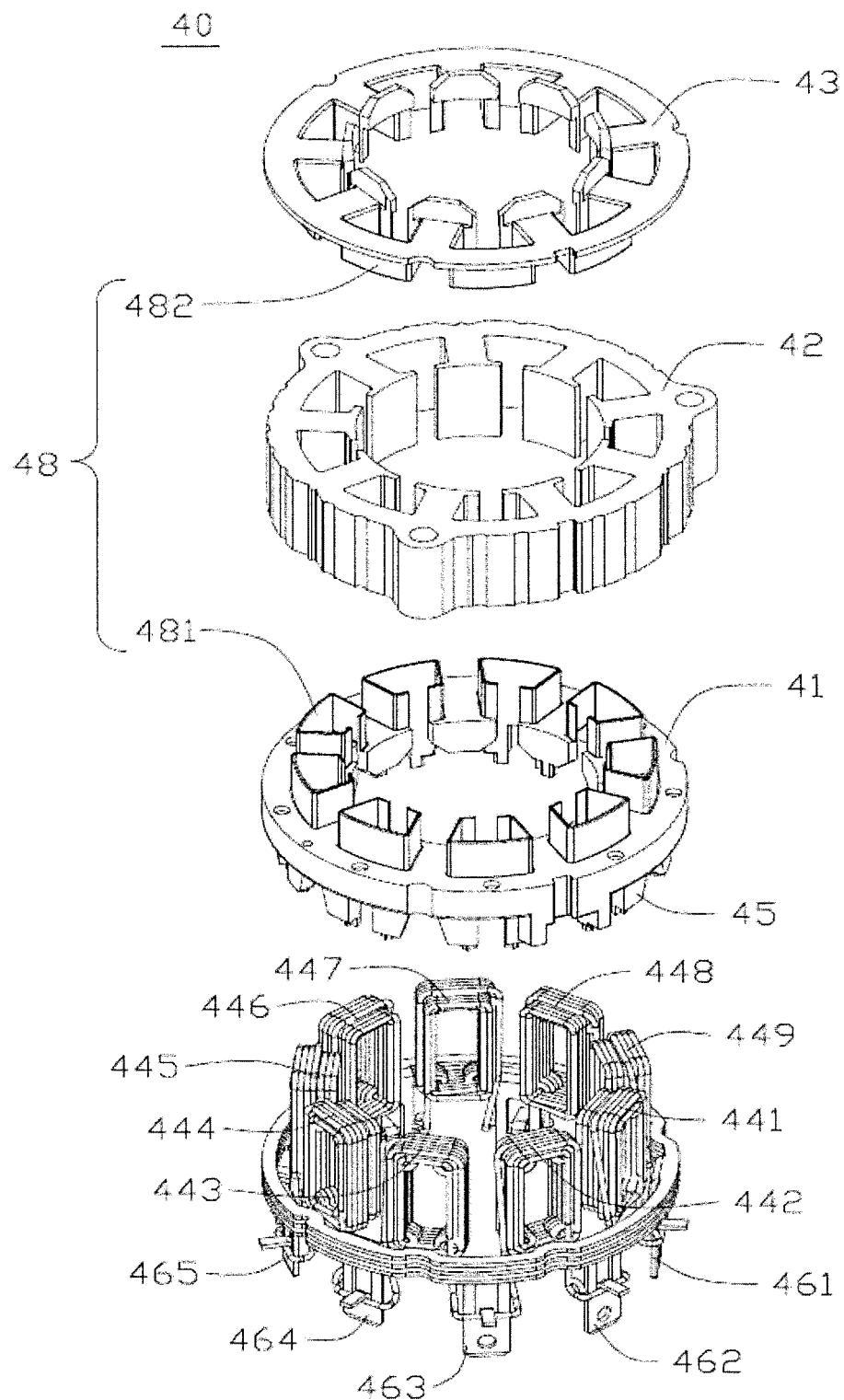

Referring to FIG. 5, the four windings 24 of the stator 20 are formed by winding the conductive wire L1. Starting from a starting end of the conductive wire L1, the conductive wire L1 is wound to sequentially form a first winding 241, a second winding 242, a third winding 243, and a fourth winding 244. During a winding process, the conductive wire L1 needs not to be cut apart, and each winding 24 has the same winding direction.

One conductive portion 26 is disposed between each two adjacent windings 24 and electrically connected with the conductive wire L1. In the sequence of winding the conductive wire L1 from its starting end to form the windings 24, the conductive portions 26 include a first conductive portion 261, a second conductive portion 262, a third conductive portion 263, and a fourth conductive portion 264. The first conductive portion 261 is connected with a starting end of the first winding 241, and the fourth conductive portion 264 is connected with a starting end of the fourth winding 244.

The first conductive portion 261 and the third conductive wire 263 faun a group, which are short-circuit connected with each other and then connected to an electrode of an external power source. In the illustrated embodiment, the first conductive portion 261 and the third conductive portion 263 are short-circuit connected through a conductive wire D1. The second conductive portion 262 and the fourth conductive wire 264 form a group, which are short-circuit connected and then connected to another electrode of the external power source. In the illustrated embodiment, the second conductive portion 262 and the fourth conductive portion 264 are short-circuit connected through another conductive wire D2.

In alternative embodiments where the stator is a multi-slot stator with another number of slots, e.g. six slots, eight slots or ten slots, the first conductive wire is connected with an odd-numbered conductive portion, and the second conductive wire is connected with an even-numbered conductive portion. The stator 20 is then connected to the external power source through the first electrically conductive portion 261 and the second electrically conductive portion 262. As such, a single conductive wire L1 is wound to sequentially form four windings 24. By electrically connecting the conductive portions 26 to the conductive wire L1 at suitable locations, short-circuit connecting the conductive portions 261 in the same group, and then connecting the short-circuit connected conductive portions 26 to an electrode of the external power source, a stator 20 can be obtained. After combining the obtained stator 20 with a suitable rotor, a single-phase motor can be obtained in which the first winding 241 and the third winding 243 are of the first phase, and the second winding 242 and the fourth winding 244 are of the second phase.

Referring to FIG. 6 to FIG. 9, a stator 40 according to another embodiment of the present disclosure is illustrated. The stator 40 is a nine-slot stator used in a motor. The motor can be a three-phase permanent magnet brushless motor. As in the previous embodiment, the stator 40 includes a first insulating frame 41, a stator core 42, a second insulating frame 43, and nine windings 44. The first insulating frame 41 is provided with guiding portions 45 each for guiding the conductive wire L3 of the windings 44 to extend from one tooth portion 422 to another adjacent tooth portion 422. Conductive portions 46 are located on a path of the conductive wire L3 extending from one tooth portion 422 to an adjacent tooth portion 422, which are electrically connected with the conductive wire L3.

Different from the previous embodiment, in this embodiment, the conductive portions 46 are equally divided into three groups, with each group containing three conductive portions 46. The conductive portions 46 in each group are electrically connected with each other, which are then connected to U, V or W phase of the external power source. The stator 40 further includes a fixing bracket 48 to surround each tooth portion 422. In the illustrated embodiment, the fixing bracket 48 includes an upper bracket 481 and a lower bracket 482, and the fixing bracket 48 is formed by an over-molding process over each tooth portion 422.

Figure 10:
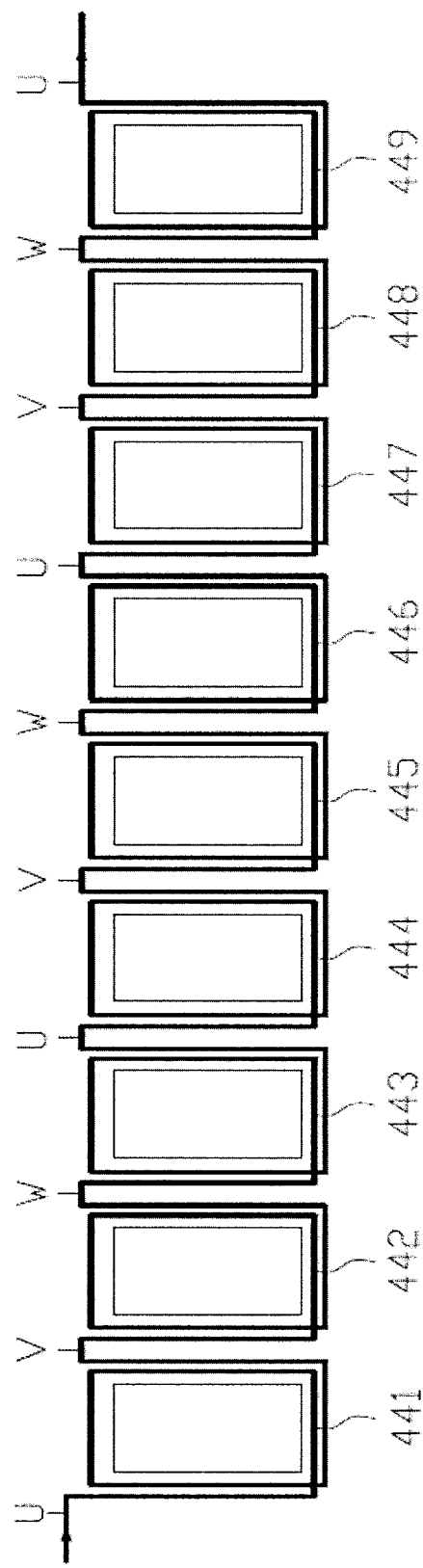
FIG. 10 and FIG. 11 illustrate routing of the stator windings and the connection of the stator windings to the external power source.
Figure 11:
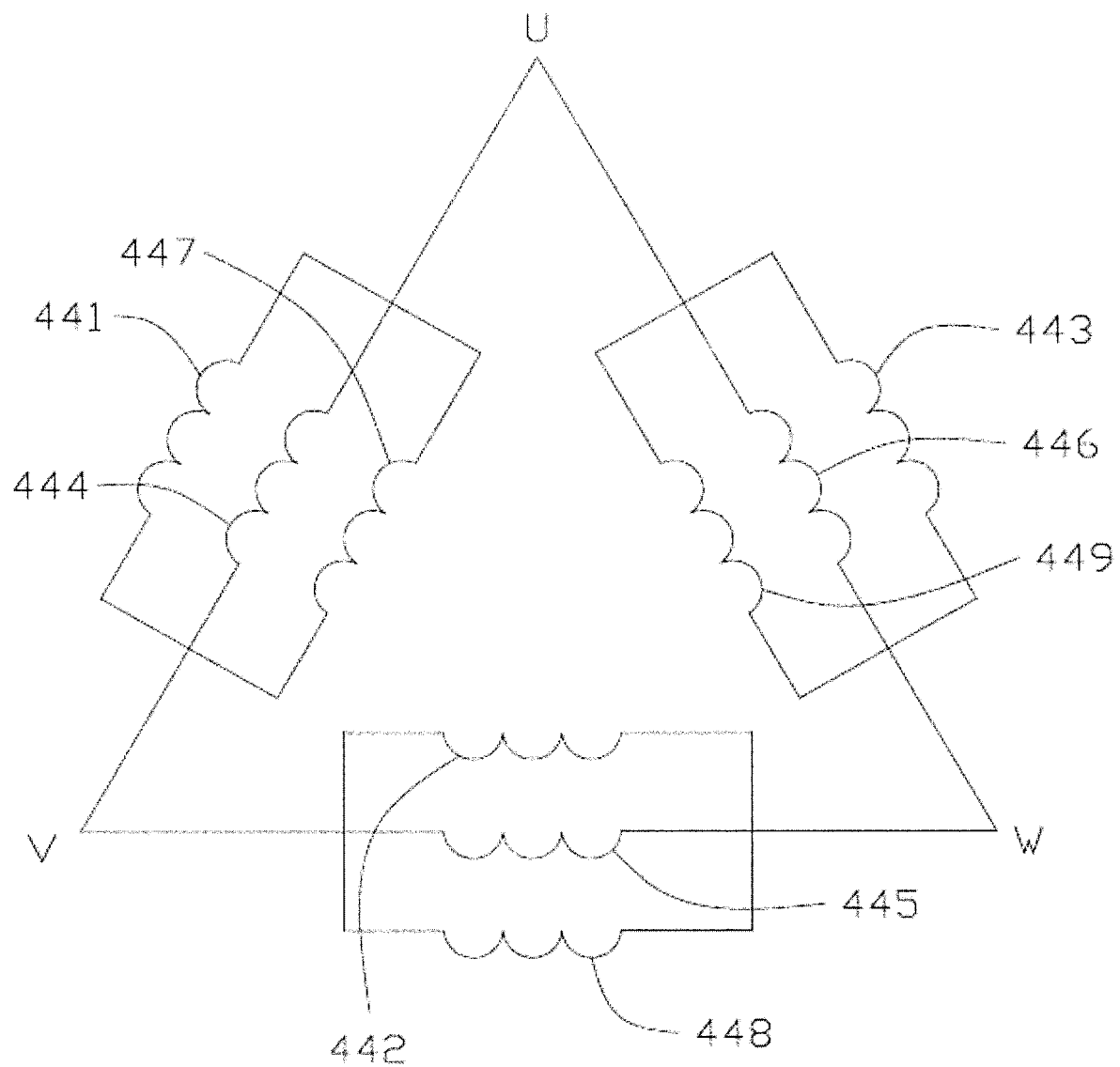

Referring also to FIG. 10 and FIG. 11, the nine windings 44 of the stator 40 are formed by winding the conductive wire L3. During the winding process, the conductive wire L3 needs not to be cut apart, and each winding 44 has the same winding direction.

Starting from a first winding 441 as shown, the conductive wire L3 is wound to sequentially form a second winding 442 to a ninth winding 449. In the sequence of winding the conductive wire L3 from its starting end to form the windings 44, the conductive portions 46 include a first conductive portion 461, a second conductive portion 462 to a ninth conductive portion 469. The first conductive portion 461, the fourth conductive portion 464, and the seventh conductive portion 467 form a group, which are short-circuit connected with one another and are then connected to U phase of the external power source. The second conductive portion 462, the fifth conductive portion 465, and the eighth conductive portion 468 form a group, which are short-circuit connected with one another and are then connected to V phase of the external power source. The third conductive portion 463, the sixth conductive portion 466, and the ninth conductive wire 469 from a group, which are short-circuit connected with one another and are then connected to W phase of the external power source.

In alternative embodiments where the stator is a multi-slot stator with 3n (n is equal to two or a natural number greater than three) slots, starting from the first conductive portion, the conductive portions numbered (3N-2) (where N is a natural number 1, . . . , n) form a first group, which are short-circuit connected with one another and are then connected to U phase of the external power source. The conductive portions numbered (3N-1) (where N is a natural number 1, . . . , n) form a second group, which are short-circuit connected with one another and are then connected to V phase of the external power source. The conductive portions numbered (3N) (where N is a natural number 1, . . . , n) form a third group, which are short-circuit connected with one another and are then connected to W phase of the external power source.

In the illustrated embodiment, the conductive portions 46 in each group are short-circuit connected with one another through conductive sheets 47 embedded in the first insulating frame 41. The conductive sheets 47 may be metal sheets. In particular, there are three conductive sheets 47, i.e. a first conductive sheet 471, a second conductive sheet 472, and a third conductive sheet 473. The conductive portions in the first group are connected to the first conductive sheet 471 to realize the short-circuit connection, the conductive portions in the second group are connected to the second conductive sheet 472 to realize the short-circuit connection, and the conductive portions in the third group are connected to the third conductive sheet 473 to realize the short-circuit connection.

In the ninth-slot stator 40 as shown, the first conductive portion 461, the fourth conductive portion 464 and the seventh conductive portion 467 are all connected to the first conductive sheet 471 to realize the short-circuit connection, the second conductive portion 462, the fifth conductive portion 465 and the eighth conductive portion 468 are all connected to the second conductive sheet 472 to realize the short-circuit connection, and the third conductive portion 463, the sixth conductive portion 466 and the ninth conductive portion 469 are all connected to the third conductive sheet 473 to realize the short-circuit connection. The first conductive sheet 471, the second conductive sheet 472 and the third conductive sheet 473 extend in an interior of the first insulating frame 41, and each conductive sheet 47 is electrically connected with a corresponding conductive portion 46 and does not contact any other conductive element. As such, a delta parallel winding for the nine-slot stator is realized by using a single conductive wire L3.

In summary, in the stator of the present disclosure, a single conductive wire is wound to form all of the windings, all of the windings have the same winding direction, and the conductive wire needs not to be cut apart during the process of winding all the windings. All windings are divided into a plurality of groups, and the windings in each group are short-circuited through the conductive wire or the conductive sheet, which are then connected to an electrode or a phase of the external power source. In particular, the conductive wire of the windings is electrically connected to an conductive portion on a path of the conductive wire extending from one specific tooth portion to another specific tooth portion. In one embodiment, more than three conductive portions are arranged, the conductive portions are divided into multiple groups, and the conductive portions in each group are short-circuit connected. As such, the windings in the corresponding group are short-circuit connected with each other, and the conductive portions in each group are connected to an electrode or a phase of the external power source. As can be seen, the stator of the present disclosure consumes less conductive wire material for the windings, the winding operation is simplified, and subsequent assembly of the stator and connecting to the external power source are also simplified.

Although the invention is described with reference to one or more embodiments, the above description of the embodiments is used only to enable people skilled in the art to practice or use the invention. It should be appreciated by those skilled in the art that various modifications are possible without departing from the spirit or scope of the present disclosure. The embodiments illustrated herein should not be interpreted as limits to the present disclosure, and the scope of the invention is to be determined by reference to the claims that follow.

The invention claimed is:

1. A stator comprising:
a stator core, a plurality of tooth portions protruding from the stator core;
a plurality of guiding portions; and
a plurality of windings respectively wound around all of the tooth portions, all of the windings on the stator being formed by winding a same single conductive wire uninterruptedly under a guide of the guiding portions, each winding being would with the same single conductive wire, the windings being divided into multiple groups, and the windings in each group being short-circuit connected with each other, wherein all the windings on the tooth portions have the same winding direction, and the single conductive wire sequentially winds the windings on the tooth portions one by one along the circumferential direction of the stator.

2. The stator of claim 1, wherein the windings in each group are short-circuit connected with each other through conductive wires or conductive sheets and connected to one electrode or one phase of an external power source.

3. The stator of claim 1, wherein the stator further comprises a first insulating frame disposed at one end of the stator core, the first insulating frame is provided with a plurality of conductive portions, and one of the conductive portions is arranged between every two adjacent windings and electrically connected with the conducting wire.

4. The stator of claim 3, wherein the number of slots between the tooth portions of the stator is 3n, the conductive portions comprises a first conductive portion to a 3nth conductive portion arranged sequentially from a start end of the conducting wire along the circumferential direction of the stator, starting from the first conductive portion, the conductive portions numbered 3N-2 form a first group, which are short-circuit connected with one another and are then connected to U phase of the external power source; the conductive portions numbered 3N-1 form a second group, which are short-circuit connected with one another and are then connected to V phase of the external power source; the conductive portions numbered 3N form a third group, which are short-circuit connected with one another and are then connected to W phase of the external power source; and wherein n is equal to two or a natural number greater than three, and N is a natural number 1, . . . , n.

5. The stator of claim 4, wherein the conductive portions in each group are short-circuit connected through conductive wires or conductive sheets so as to short-circuit connecting the corresponding group of windings.

6. The stator of claim 5, wherein the conductive sheets are embedded in the first insulating frame.

7. The stator of claim 3, wherein the number of slots between the tooth portions of the stator is an even number, the number of the conductive portions is equal to the number of the slots, the conductive portions are arranged sequentially from a start end of the conducting wire along the circumferential direction of the stator, odd-numbered conductive portions form a first group, which are short-circuit connected with one another and are then connected to one electrode of the external power source; even-numbered conductive portions form a second group, which are short-circuit connected with one another and are then connected to the other electrode of the external power source.

8. The stator of claim 3, wherein each of the conductive portions comprises a wire clip configured to clamp the conductive wire of the winding and form an electrical connection with the conductive wire of the winding.

9. The stator of claim 3, wherein the stator further includes a second insulating frame disposed at another end of the stator core, opposite from the first insulating frame.

10. The stator of claim 9, wherein the guiding portions are integrally formed with the first insulating frame or the second insulating frame, and each guiding portion is configured to guide the conductive wire to extend from one tooth portion to one adjacent tooth portion.

11. A motor comprising the stator of claim 1.

12. The motor of claim 11, wherein the motor is a single phase permanent magnet brushless motor or a three phase permanent magnet brushless motor.

13. The motor of claim 11, wherein the windings in each group are short-circuit connected with each other through conductive wires or conductive sheets and connected to one electrode or one phase of an external power source.

14. The motor of claim 11, wherein a plurality of conductive portions are arranged on an end of the stator and electrically connected with the conducting wire.

15. The motor of claim 14, wherein the stator further comprises a first insulating frame disposed at one end of the stator core, the conductive portions are disposed on the first insulating frame.

16. The motor of claim 14, wherein the number of slots between the tooth portions of the stator is 3n, the conductive portions comprises a first conductive portion to a 3nth conductive portion arranged sequentially from a start end of the conducting wire along the circumferential direction of the stator, starting from the first conductive portion, the conductive portions numbered 3N-2 form a first group, which are short-circuit connected with one another and are then connected to U phase of the external power source; the conductive portions numbered 3N-1 form a second group, which are short-circuit connected with one another and are then connected to V phase of the external power source; the conductive portions numbered 3N form a third group, which are short-circuit connected with one another and are then connected to W phase of the external power source; and wherein n is equal to two or a natural number greater than three, and N is a natural number 1, . . . , n.

17. The motor of claim 16, wherein the conductive portions in each group are short-circuit connected through conductive wires or conductive sheets so as to short-circuit connecting the corresponding group of windings.

18. The motor of claim 14, wherein the number of slots between the tooth portions of the stator is an even number, the number of the conductive portions is equal to the number of the slots, the conductive portions are arranged sequentially from a start end of the conducting wire along the circumferential direction of the stator, odd-numbered conductive portions form a first group, which are short-circuit connected with one another and are then connected to one electrode of the external power source; even-numbered conductive portions form a second group, which are short-circuit connected with one another and are then connected to the other electrode of the external power source.

19. A motor comprising a stator, the stator comprising:
a stator core, a plurality of tooth portions protruding from the stator core; and
a plurality of windings respectively wound around all of the tooth portions, all of the windings on the stator being formed by winding a same single conductive wire uninterruptedly, each winding being would with the same single conductive wire, the windings being divided into multiple groups, and the windings in each group being short-circuit connected with each other,
wherein the windings in each group are short-circuit connected with each other through conductive wires or conductive sheets and connected to one electrode or one phase of an external power source,
wherein a conductive portion is arranged between every two adjacent windings and electrically connected with the conducting wire, and
wherein the number of slots between the tooth portions of the stator is 3n, the conductive portions comprises a first conductive portion to a 3nth conductive portion arranged sequentially from a start end of the conducting wire along the circumferential direction of the stator, starting from the first conductive portion, the conductive portions numbered 3N-2 form a first group, which are short-circuit connected with one another and are then connected to U phase of the external power source; the conductive portions numbered 3N-1 form a second group, which are short-circuit connected with one another and are then connected to V phase of the external power source; the conductive portions numbered 3N form a third group, which are short-circuit connected with one another and are then connected to W phase of the external power source; and wherein n is equal to two or a natural number greater than three, and N is a natural number 1, . . . , n.

20. A motor comprising a stator, the stator comprising:
a stator core, a plurality of tooth portions protruding from the stator core; and
a plurality of windings respectively wound around all of the tooth portions, all of the windings on the stator being formed by winding a same single conductive wire uninterruptedly, each winding being would with the same single conductive wire, the windings being divided into multiple groups, and the windings in each group being short-circuit connected with each other,
wherein the windings in each group are short-circuit connected with each other through conductive wires or conductive sheets and connected to one electrode or one phase of an external power source,
wherein a conductive portion is arranged between every two adjacent windings and electrically connected with the conducting wire, and
wherein the number of slots between the tooth portions of the stator is an even number, the number of the conductive portions is equal to the number of the slots, the conductive portions are arranged sequentially from a start end of the conducting wire along the circumferential direction of the stator, odd-numbered conductive portions form a first group, which are short-circuit connected with one another and are then connected to one electrode of the external power source; even-numbered conductive portions form a second group, which are short-circuit connected with one another and are then connected to the other electrode of the external power source.

* * * * *